(12) United States Patent
Lin et al.

(10) Patent No.: US 10,372,855 B2
(45) Date of Patent: Aug. 6, 2019

(54) SCAN CELL SELECTION FOR PARTIAL SCAN DESIGNS

(71) Applicant: Mentor Graphics Corporation, Wilsonville, OR (US)

(72) Inventors: Xijiang Lin, West Linn, OR (US); Ting-Pu Tai, Taipei (TW); Wu-Tung Cheng, Lake Oswego, OR (US); Takeo Kobayashi, Beaverton, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 260 days.

(21) Appl. No.: 14/633,999

(22) Filed: Feb. 27, 2015

(65) Prior Publication Data

US 2015/0248515 A1 Sep. 3, 2015

Related U.S. Application Data

(60) Provisional application No. 61/946,693, filed on Feb. 28, 2014.

(51) Int. Cl.
*G06F 17/50* (2006.01)
*G01R 31/00* (2006.01)
*G01R 31/317* (2006.01)
*G01R 31/3185* (2006.01)
*G01R 31/28* (2006.01)

(52) U.S. Cl.
CPC ....... *G06F 17/5045* (2013.01); *G01R 31/317* (2013.01); *G01R 31/318533* (2013.01); *G01R 31/318586* (2013.01); *G06F 17/5022* (2013.01); *G06F 17/5068* (2013.01); *G06F 17/5081* (2013.01); *G01R 31/2803* (2013.01); *G01R 31/2815* (2013.01); *G01R 31/2818* (2013.01); *G01R 31/2851* (2013.01); *G01R 31/2856* (2013.01); *G01R 31/31704* (2013.01); *G06F 17/5072* (2013.01); *G06F 2217/14* (2013.01)

(58) Field of Classification Search
None
See application file for complete search history.

(56) References Cited

U.S. PATENT DOCUMENTS 5,450,414 A * 9/1995 Lin ............... G01R 31/318342
324/750.3
6,134,687 A * 10/2000 Chakradhar ... G01R 31/318586
714/724

(Continued)

OTHER PUBLICATIONS

D. Xiang, S. Venkataraman, W.K. Fuchs, J.H. Patel, "Partial Scan Design Based on Circuit State Information", in Proc. of Design Automation Conf., 1996, pp. 807-812.*

(Continued)

*Primary Examiner* — Leigh M Garbowski (57) ABSTRACT

Various aspects of the disclosed technology relate to techniques of selecting scan cells from state elements for partial scan designs. Signal probability values for logic gates in a circuit design are first determined. Based on the signal probability values, next-state capture probability values for state elements in the circuit design are computed. Based on the next-state capture probability values, scan cells are selected from the state elements. Scan cells may be further selected based on continuously-updated control weight values and observation weight values associated with the state elements.

14 Claims, 3 Drawing Sheets

(56) References Cited

U.S. PATENT DOCUMENTS

| | | | |
|---|---|---|---|
| 6,256,759 B1* | 7/2001 | Bhawmik | G01R 31/318591 |
| | | | 714/726 |
| 6,463,561 B1* | 10/2002 | Bhawmik | G01R 31/31707 |
| | | | 714/726 |
| 8,164,345 B2* | 4/2012 | Bushnell | G01R 31/318583 |
| | | | 324/537 |

OTHER PUBLICATIONS

J.M. Fernandes et al., "DFT and Probabilistic Testability Analysis at RTL," 2006 IEEE Int'l High Level Design and Test Workshop, pp. 41-47.*

W. Li et al., "A Scan BIST Generation Method Using a Markov Source and Partial Bit-Fixing," DAC 2003, 6 pages.*

A. Matrosova et al., "Selection of the State Variables for Partial Enhanced Scan Techniques," 2011 IEEE, 6 pages.*

H.-C. Liang et al., "Partial Reset and Scan for Flip-Flops Based on States Requirement for Test Generation," 16$^{th}$ IEEE Proc. VLSI Test Symposium, 1998, pp. 341-344 [pp. 345-346 missing].*

C. Han et al., "Efficient Partial Enhanced Scan for High Coverage Delay Testing," 2011 IEEE 43$^{rd}$ Southeastern Symposium System Theory (SSST), 6 pages.*

M.-L. Flottes et al., "Partial Set for Flip-Flops Based on State Requirement for Non-scan BIST Scheme," Proc. 1999 IEEE European Test Workshop, 6 pages.*

W. Zhao et al., "Power-Safe Test Application Using Effective Gating Approach Considering Current Limits," 2011 29$^{th}$ IEEE VLSI Test Symposium, pp. 160-165.*

R. Gupta, and M.A. Breuer, "The Ballast Methodology for Structured Partial Scan Design," in IEEE Trans on Comp., vol. 39, Issue 4, 1990.

A. Kunzmann and H.-J. Wunderlich, "An Analytical Approach to the Partial Scan Problem," in Journal of Electronic Testing, May 1990, pp. 163-174.

K.-T. Cheng and V.D. Agrawal, "A Partial Scan Method for Sequential Circuits with Feedback", in IEEE Trans. on computers, vol. 39, Apr. 1990, pp. 544-548.

D. Xiang, J.H. Patel, "Partial Scan Design Based on Circuit State Information and Functional Analysis," IEEE Trans. on Computers, vol. 53, No. 3, Mar. 2004, pp. 276-287.

\* cited by examiner

SCAN CELL SELECTION FOR PARTIAL SCAN DESIGNS

RELATED APPLICATIONS

This application claims the benefit of U.S. Provisional Patent Application No. 61/946,693, filed on Feb. 28, 2014, and naming Xijiang Lin et al. as inventors, which application is incorporated entirely herein by reference.

FIELD OF THE DISCLOSED TECHNIQUES

The presently disclosed techniques relates to the field of circuit testing technology. Various implementations of the disclosed techniques may be particularly useful for creating partial scan designs.

BACKGROUND OF THE DISCLOSED TECHNIQUES

Scan-based testing has been extensively used in industry to reduce test cost. In the scan-based testing, state elements in a design such as latches and flip-flops are replaced by scan cells and the scan cells are then stitched together to create one or more scan chains. The controllability and observability of the scan cells enable significant reduction of the test cost. When all of the state elements in a design are replaced by scan cells, the resulted design is called a full-scan design. When a portion of state elements is replaced by scan cells, the resulted design is called a partial scan design.

Compared with a non-scan state element, a scan cell requires extra area to accommodate additional gates and control signals for the test function. This leads to performance degradation and higher power consumption. Routing the non-functional scan enable signal to each scan cell also causes routing congestion. The use of partial scan can reduce area overhead, power consumption, and extra delay by converting a smaller number of state elements to scan cells. The test coverage (percentage of defects that can be detected), however, can be affected accordingly. The adverse effect may be severe if the state elements to be converted to scan cells are not selected properly.

Scan cells may be selected based on a structural analysis. In the structural analysis, a structural dependency graph (S-graph) is first created based on connections between state elements. Different methods may then be applied by analyzing the S-graph. One conventional method breaks all feedback loops (including self-loops) so that the resulting design behaves like a pipeline during testing. In industrial designs, especially microprocessor designs, it is common that a majority of state elements have self-loops. Breaking all of the loops is difficult if not impossible to meet the desired percentage of state elements to be converted to scan cells.

Another structural analysis-based method breaks all feedback loops except self-loops. Leaving self-loops intact, however, may cause a significant loss of test coverage because it may be difficult or even impossible to have a test sequence to set the next state of a state element with self-loop to a desirable value when initializing this state element from unknown. Moreover, feedback loops may not always cause test generation problems. If the state elements including in a feedback loop are easy to be controlled from primary inputs or other sequential elements outside the loop, it is unnecessary to break such a sequential loop.

Still another structural analysis-based method is based on sequential depth information of state elements. This method ignores the complexity of combinational circuits between sequential elements and thus may lead to a selection of scan cells that could not yield desired test coverage.

In addition to the structural analysis-based methods, test generation-based methods have also been developed. For example, information derived from a test pattern generator can be used to guide the scan cell selection incrementally so that aborts or untestable-faults would be detected after more state elements become scan cells. However, these methods suffer from extreme high computational complexity and are not feasible for large designs.

BRIEF SUMMARY OF THE DISCLOSED TECHNIQUES

Various aspects of the disclosed technology relate to techniques of selecting scan cells from state elements for partial scan designs. In one aspect, there is a method, executed by at least one processor of a computer, comprising: computing signal probability values for logic gates in a circuit design; computing next-state capture probability values for state elements in the circuit design based on the signal probability values, wherein if a state element in the state elements forms a self-loop, the computing is further based on assuming current-state signal probability values of the state element to be zero; and selecting scan cells from the state elements based on the next-state capture probability values.

In another aspect, there are one or more non-transitory computer-readable media storing computer-executable instructions for causing one or more processors to perform the method recited above.

The method recited above may further comprise: further selecting scan cells from the state elements based on control weight values and observation weight values associated with the state elements, wherein the control weight value of a state element corresponds to controllability of the state element and the observation weight value of a state element corresponds to observability of the state element, and the control weight values and the observation weight values are updated when a state element is selected.

The further selecting may be performed until a predefined percentage of the state elements are selected. The further selecting may comprise: calculating weighted sums of the control weight values and the observation weight values and weighted differences of the control weight values and the observation weight values for the state elements.

An initial value of the control weight value of a state element may be determined based on complexity of combinational logic coupled to one or more inputs of the state element, and an initial value of the observation weight value of the state element may be determined based on complexity of combinational logic coupled to one or more outputs of the state element. The complexity of combinational logic may be represented by next-state capture probability values.

In still another aspect, there is a system, comprising: a signal probability determination unit configured to determine signal probability values for logic gates in a circuit design; a next-state capture probability computation unit configured to compute next-state capture probability values for state elements in the circuit design based on the signal probability values, wherein if a state element in the state elements forms a self-loop, the computing is further based on assuming current-state signal probability values of the state element to be zero; and a probability-based scan cell selection unit configured to select scan cells from the state elements based on the next-state capture probability values.

The system may further comprise a weight-based scan cell selection unit configured to further select scan cells from the state elements based on control weight values and observation weight values associated with the state elements, wherein the control weight value of a state element corresponds to controllability of the state element and the observation weight value of a state element corresponds to observability of the state element, and the control weight values and the observation weight values are updated when a state element is selected.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

General Considerations

Various aspects of the disclosed technology relate to selecting scan cells from state elements for partial scan designs. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine" and "compute" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

Figure 1:
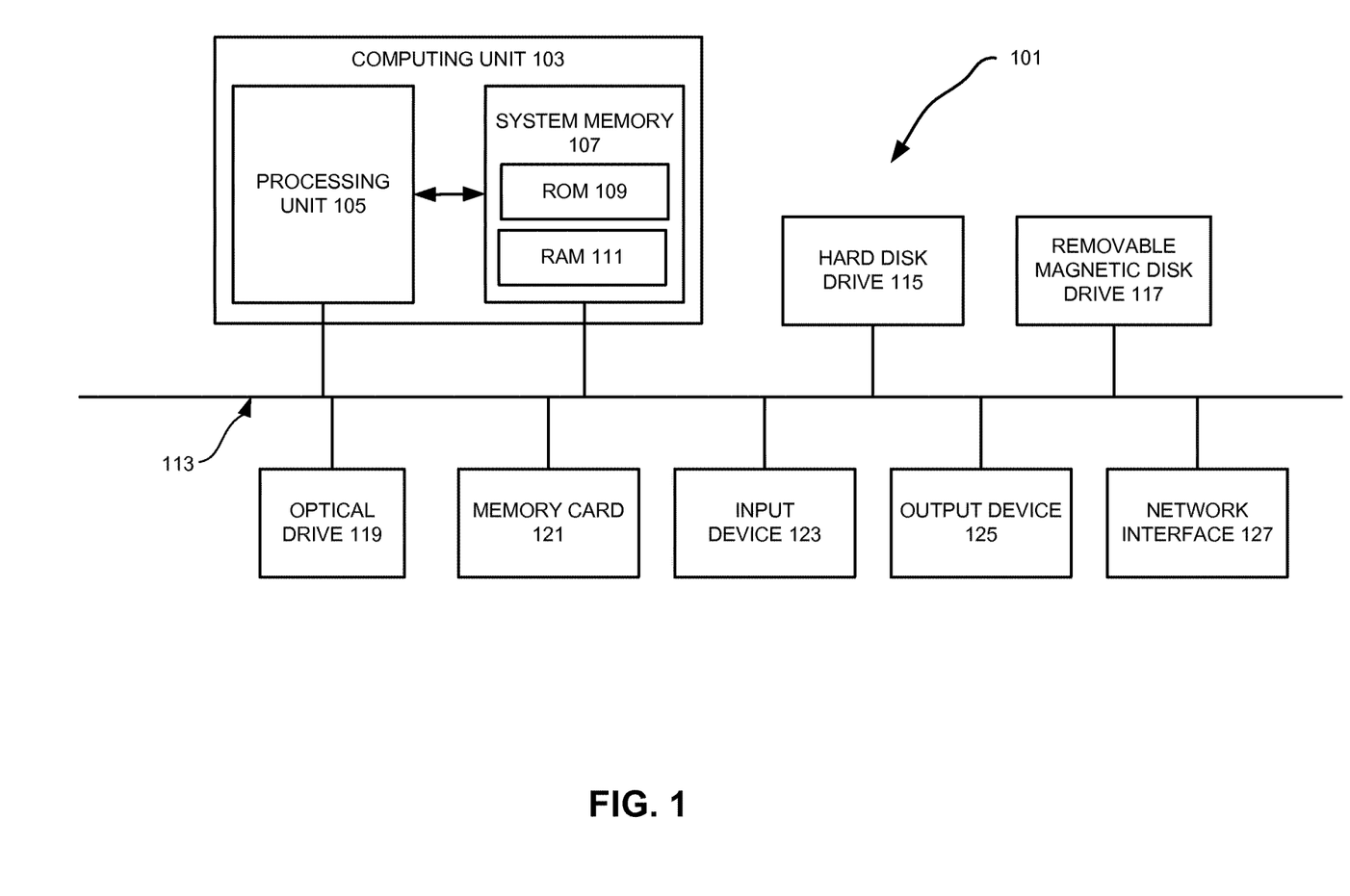
FIG. 1 illustrates a programmable computer system with which various embodiments of the disclosed technology may be employed.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multiprocessor computer, a plurality of single and/or multiprocessor computers arranged into a network, or some combination of both.

Terminologies

Definitions of some technical terms used in this disclosure are provided below.

A sequential element is a sequential logic element such as a flip-flop and a latch or a memory element such as RAM (Random Access Memory). A sequential logic element is a logic element whose output at any given moment depends, in part, on previous states.

A state element is a sequential logic element.

A transparent latch is a latch that has a level sensitive trigger input such that when the trigger signal is in the "enable" state the outputs follows the inputs, and when the trigger signal goes to the "latch" state the outputs retain the data then at the inputs.

A path from a gate $g_0$ to a gate $g_n$ is a list of ordered gates $\{g_i, 0 \le i \le n\}$, where $g_{i+1}$ input is driven by $g_i$ output through net.

An unblocked path is a path that the output value of the gate $g_{i+1}$ depends on the value assignment at its driving gate $g_i$ for $1 \le i \le n$.

A combinational path is a path that does not include any sequential element.

An unobservable state element is a state element that cannot reach other sequential elements or observable primary outputs through non-blocked combinational path(s).

An S-graph is a directed graph, SG(V, E), extracted from a design, where V is a finite set of nodes and each node is associated with one of primary inputs, primary outputs, or sequential elements in the design, and the edge set E is a binary relation on V and a directed edge exists from a node $u \in V$ to a node $w \in V$ when there exists at least one non-blocked combinational path from u to w.

Signal probability is the probability to set a logic value $y \in \{0, 1\}$ at a gate in the design. Two signal probability values, P(0) and P(1), are associated with each gate in the design.

Scan Cell Selection Tools and Methods

Figure 2:
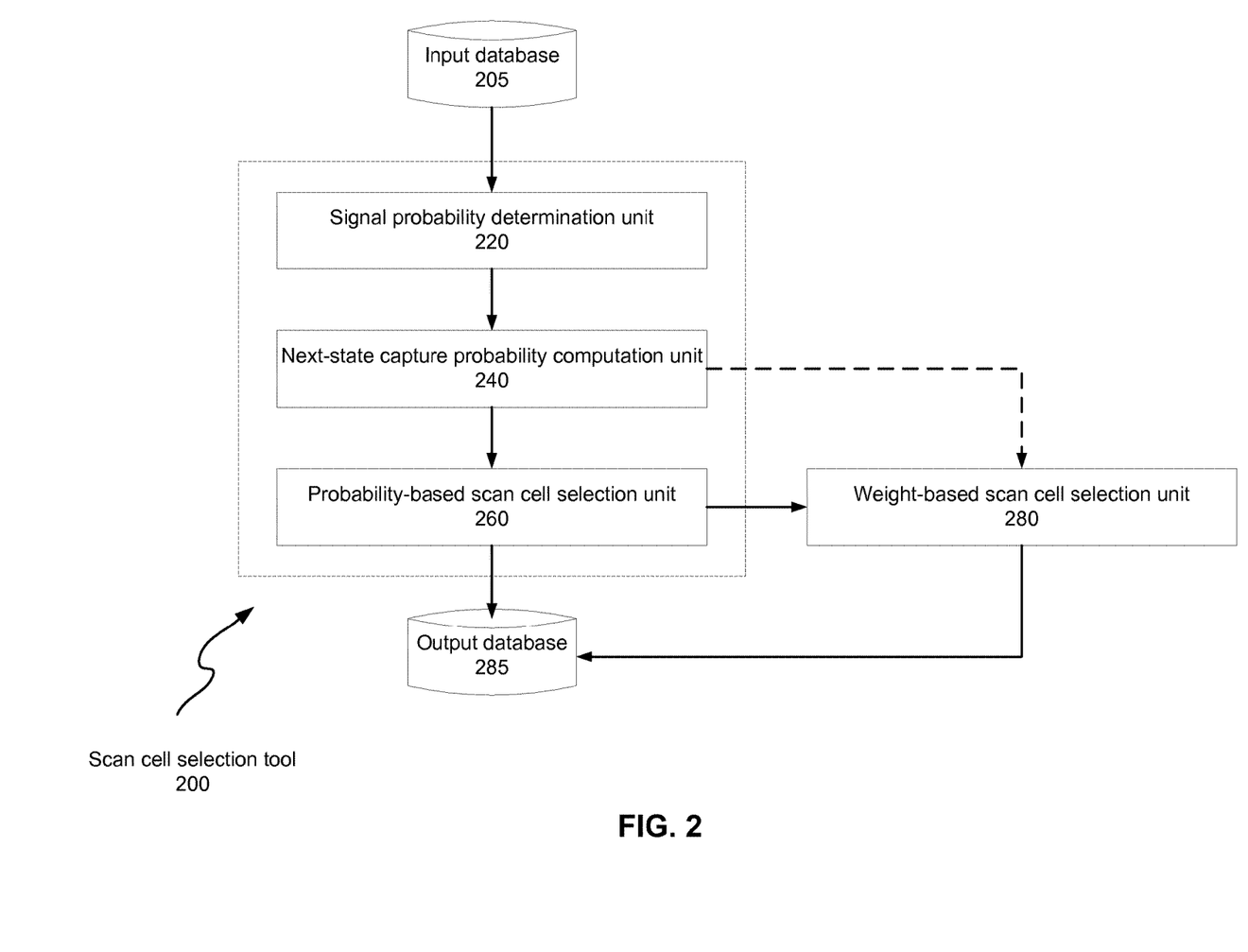
FIG. 2 illustrates an example of a scan cell selection tool according to various embodiments of the disclosed technology.

FIG. 2 illustrates an example of a scan cell selection tool according to various embodiments of the disclosed technology. As seen in the figure, the scan cell selection tool 200 includes three units: a signal probability determination unit 220, a next-state capture probability computation unit 240, and a probability-based scan cell selection unit 260. Some implementations of the diagnosis tool 200 may cooperate with or incorporate one or more of a weight-based scan cell selection unit 280, an input database 205, and an output database 285.

As will be discussed in more detail below, the signal probability determination unit 220 determines signal probability values for logic gates in a circuit design. Based on the signal probability values, the next-state capture probability computation unit 240 computes next-state capture probability values for state elements in the circuit design. Based on the next-state capture probability values, the probability-based scan cell selection unit 260 selects scan cells from the state elements. The weight-based scan cell selection unit 280 may further select scan cells from the state elements based on control weight values and observation weight values associated with the state elements which are continuously updated.

As previously noted, various examples of the disclosed technology may be implemented by a computing system, such as the computing system illustrated in FIG. 1. Accordingly, one or more of the signal probability determination unit 220, the next-state capture probability computation unit 240, the probability-based scan cell selection unit 260, and the weight-based scan cell selection unit 280 may be implemented by executing programming instructions on one or more processors in a computing system such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the signal probability determination unit 220, the next-state capture probability computation unit 240, the probability-based scan cell selection unit 260, and the weight-based scan cell selection unit 280. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

It also should be appreciated that, while the signal probability determination unit 220, the next-state capture probability computation unit 240, the probability-based scan cell selection unit 260, and the weight-based scan cell selection unit 280 are shown as separate units in FIG. 2, a single computer (or a single processor within a master computer) may be used to implement two or more of these units at different times, or components of two or more of these units at different times.

With various examples of the disclosed technology, the input database 205 and the output database 285 may be implemented using any suitable computer readable storage device. That is, either of the input database 205 and the output database 285 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 205 and the output database 285 are shown as separate units in FIG. 2, a single data storage medium may be used to implement some or all of these databases.

Figure 3:
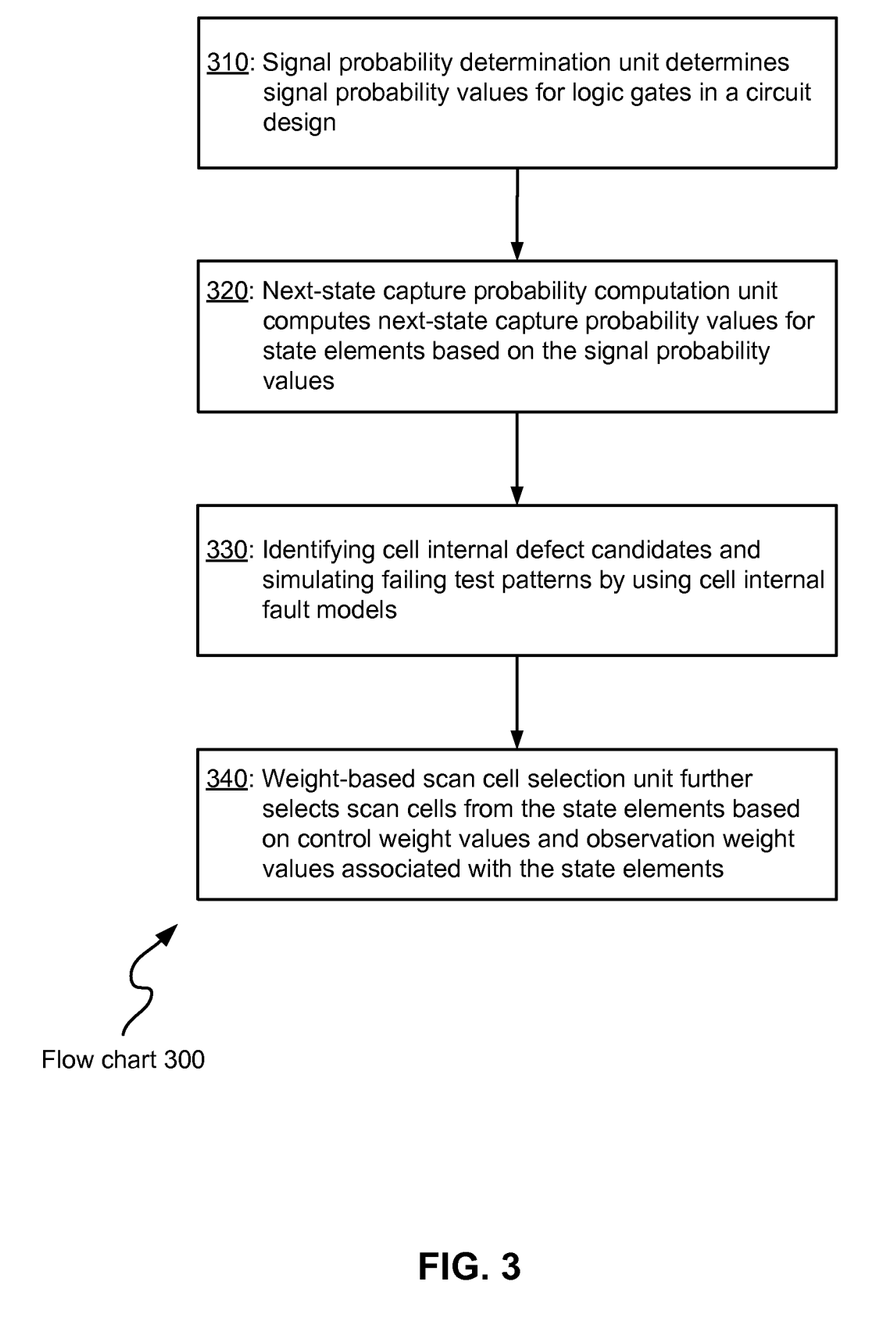
FIG. 3 illustrates a flowchart showing a process of scan cell selection that may be implemented according to various examples of the disclosed technology.

FIG. 3 illustrates a flowchart 300 showing a process of scan cell selection for partial scan designs that may be implemented according to various examples of the disclosed technology. For ease of understanding, methods of scan cell selection that may be employed according to various embodiments of the disclosed technology will be described with reference to the scan cell selection tool 200 illustrated in FIG. 2 and the flow chart 300 in FIG. 3. It should be appreciated, however, that alternate implementations of a scan cell selection tool may be used to perform the method of scan cell selection in the flow chart 300 according to various embodiments of the disclosed technology. In addition, it should be appreciated that implementations of the scan cell selection tool 200 may be employed to implement methods of scan cell selection according to different embodiments of the disclosed technology other than the one illustrated by the flow chart 300 in FIG. 3.

Initially, in operation 310 of the flow chart 300, the signal probability determination unit 220 determines signal probability values for logic gates in a circuit design. The circuit design has both sequential elements and combinational elements. The scan cell selection tool 200 may create an S-graph first to represent signal flow among primary inputs, primary outputs, and the sequential elements. During test generation, some primary inputs are often constrained to constant values during capture. These constrained values may lead to some of the combinational paths between sequential elements being blocked. Converting the involved state elements to scan cells will not make faults on the blocked paths become testable. Accordingly, an edge is added between two nodes in the S-graph only if there exists at least one unblocked combinational path between the two nodes. To identify blocked paths, simulation may be performed with the constrained primary inputs being set at the constrained values.

Based on the S-graph, unobservable state elements can be identified. A state element becomes unobservable when the paths passing through or starting from the state element terminate at a masked primary output or the state element itself. A primary output may be masked in various situations. For example, by utilizing the embedded Phase Lock Loop (PLL) in the design, a low cost tester can perform at-speed testing for high frequency designs even though the low cost tester cannot measure the primary outputs at-speed. In these cases, it is often required to mask out all primary outputs such that they become unobservable during test generation.

Because defects existed at the logic driving an unobservable state element is untestable, the unobservable state element usually needs to be selected and converted to a scan cell. Having been selected, an unobservable state element can be treated as a primary output/input.

Two examples are used here to illustrate the determination of signal probability values for logic gates. A two-input AND gate has an output value of "1" only when both its input values are "1", and an output value of "0" when one or both of its input values are "0". Thus, the signal probability values for an AND gate is $P(0)=0.75$ and $P(1)=0.25$. By contrast, a two-input OR gate has an output value of "0" only when both its input values are "0", and an output value of "1" when one or both of its input values are "1". Thus, the signal probability values for an OR gate is $P(1)=0.75$ and $P(0)=0.25$. As the examples show, the signal probability values for a logic gate may be determined based on the type of and the number of inputs of the logic gate.

Next, in operation 320, the next-state capture probability computation unit 240 computes next-state capture probability values for state elements in the circuit design based on the signal probability values. With the help of the S-graph, the next-state capture probability values for a state element may be derived by propagating current-state signal probability values of the immediate fan-in node(s) of the state element through combinatorial paths.

The current-state signal probability values of a fully-controllable state element and of an unconstrained primary input may be assumed to be 50% for being "1" and "0", $P(1)=P(0)=0.5$; the current-state signal probability values of a primary input constrained to "1" ("0") may be assumed to be $P(1)=1$ and $P(0)=0$ ($P(0)=1$ and $P(1)=0$); and the current-state signal probability values of RAM and the current-state signal probability values of a state element in a self-loop may be assumed to be zero, $P(1)=P(0)=0$.

If a state element has one immediate fan-in node with current-state signal probability values being $P(1)=P(0)=0.5$. The combinational path between them has an AND gate. Then, the next-state capture probability values are $P^{next}(1)=0.5\times0.25=0.125$ and $P^{next}(0)=0.5\times0.75=0.375$.

Next, in operation 330, the probability-based scan cell selection unit 260 selects scan cells from the state elements based on the next-state capture probability values. If it is difficult or impossible to set either value 0 or value 1 at a state element, the test generator may not be able to detect faults reachable from this state element. The controllability of this state element thus needs to be improved through scan. The probability-based scan cell selection unit 260 may use a predefined threshold for the next-state capture probability values to identify the state elements that need to be converted to scan cells. For example, if either $P^{next}(1)$ or $P^{next}(0)$ of a state element is not greater than the predefined threshold, the state element will be chosen as a scan cell.

Industrial designs often contain self-loops—combinational path(s) starting from a state element output and ending at the same state element input. Being in a self-loop, the next state of the state element depends on its current state. This may make it impossible to change to a known value $v\in\{0,1\}$ during capture, resulting in a test coverage loss. The probability-based scan cell selection unit 260 may use a predefined threshold for the next-state capture probability values to determine whether to break a self-loop by selecting the state element of the self-loop as a scan cell. This predefined threshold may be the same as or different from the above threshold.

Optionally, in operation 340, the weight-based scan cell selection unit 280 further selects scan cells from the state elements based on control weight values and observation weight values associated with the state elements.

A test pattern typically includes one or more capture cycles for activating a fault site and some additional capture cycles for propagating the fault effect to an observation point. The test generation complexity typically grows exponentially with the increase of the number of capture cycles used by test patterns. A desirable partially scan design should allow test patterns generated for detecting a majority of faults to use capture cycles as few as possible. Reducing sequential control depth and/or sequential observation depth can decrease the number of capture cycles. The weight-based scan cell selection unit 280 assigns and computes sequential-depth-related weight values to sequential elements and use these weight values to guide the scan cell selection.

The weight values of a state element include a control weight value (wc) corresponding to controllability of the state element and an observation weight value (wo) corresponding to observability of the state element. The initial weight values may be set as follows: If a primary input is constrained to X during test generation, $wc_i$=Infinity and $wo_i=0$ initially, otherwise, $wc_i=wo_i=0$; if a primary output is masked as non-observation point during test generation, $wo_i$=Infinity and $wc_i=0$ initially, otherwise, $wc_i=wo_i=0$; any meaningful non-negative values that measure the difficulty of capturing data into a state element can be used as weights.

The weights of each state element may be determined by the complexity of the combinational logic driving the state elements. For example, the next-state capture probability values may be used as the initial weight values. If there is no intention to assign different weight values to different state elements, we may set $wc_i = wo_i = 1$ to every state element initially.

Any meaningful non-negative values that measure the difficulty of writing to a RAM and reading from it can be used as the weight values. Typically, RAMs are more difficulty to be controlled than state elements. Accordingly, larger weights are assigned to RAMs. For example, the weight values of each RAM may be determined by the complexity of the combinational logic driving the RAMs. If there is no intention to assign different weights for the RAMs, we may set $wc_i = wo_i = 2$ to every RAM initially.

After the initial weight values are set, the weight-based scan cell selection unit 280 may compute the control weight values and the observation weight values starting from the primary inputs/selected scan cells and the primary outputs/selected scan cells, respectively. The sequential control depth is measured by the shortest weighted path from primary inputs or scan cells to a state element; and the sequential observation depth is measured by the shortest weighted path from a state element to non-masked primary outputs or scan cells. Both the control weight values and the observation weight values are updated whenever a state element is selected.

When there exist masked primary outputs, it is possible that some state elements cannot reach to any observation points (scan cells/primary outputs). The weight-based scan cell selection unit 280 may select a subset of scan cells such that all state elements can reach to at least one observation point. The process may comprise iteratively selecting state elements with largest sequential control depth till all the nodes associated with the state elements in SG have observation weight values that are not infinity.

For other state elements, the weight-based scan cell selection unit 280 search for the state element with the current largest sum of the sequential control depth and the sequential observation depth, but with minimal difference between the sequential control depth and the sequential observation depth. This is based on the pipeline design, i.e., it is better to select the state elements in the middle of the pipeline. Two predefined parameters $\alpha$ and $\beta$ may be used to bias the importance of the control depth and the observation depth. Setting $\alpha = \beta = 0.5$ means there is no bias.

A latch is transparent if at least one of its clock ports has logic value 1 when all the clocks are in their off state during capture. When switching from the shift phase to the capture phase, all the clocks are typically forced to be off initially. If the transparent latch is selected as the scan cell, its loading value will be not hold. On the other hand, it is common that the clock gaters are implemented by using transparent latches. Accordingly, the scan cell selection tool 200 may identify transparent latches from state element and preclude them from being selected.

The weight-based scan cell selection unit 280 may continue the selection process until a predefined percentage of the state elements are selected.

The following pseudo code is an example of implementing the flow chart 300:

Procedure scan_selection(D, $S_p$)
// D: The design netlist.
// $S_p$: The percentage of state elements being selected as scan.
1. Create simulation background by implying all primary inputs constrained during capture to their constrained value. The simulation background is used to check the non-blocked combinational paths between any two gates in the design.
2. Create the S-graph, SG, from the design netlist D, which includes N nodes.
3. For the $i^{th}$ node in SG, set $c_i$=false and $s_i$=false if it is associated with primary inputs, primary outputs, or RAMs. Otherwise, set $c_i$=true and $s_i$=false. $c_i$=true means the $i^{th}$ node in SG is a scan selection candidate, and changing $s_i$ from false to true means the $i^{th}$ node is selected as a scan cell.
4. Associate two non-negative weights, {$wc_i$ and $wo_i$, $0 \leq i \leq N-1$}, to every node in SG, where $wc_i$ is used to measure the difficulty to control the $i^{th}$ node from its inputs and $wo_i$ is used to measure the difficulty to observe through the $i^{th}$ node. The initial values of these two weights are predefined for each node.
5. Identify all unobservable state elements and select them as scan cells. In this step as well as the following steps, setting $s_i$=true will be automatically carried out once the $i^{th}$ node in SG is selected as a scan cell.
6. Identify all the transparent latches in D. If the $i^{th}$ node with $s_i$=false is identified as the transparent latch, set $c_i$=false to disable it to be selected as a scan cell as well as assign $wc_i = wo_i = 0$.
7. Call control_analysis(D, SG) to identify state elements that are must be scanned due to low controllable.
8. The number of scan cells selected so far over the total number of state elements in the design gives a lower bound of scan percentage to avoid test coverage loss.
9. Call weight_based_analysis(SG, $S_p$) to select more scan cells to meet the scan selection percentage $P_s$.
10. Return the set of selected scan cells.

Procedure control_analysis(D, SG)
1. Assign the signal probabilities P(0)=P(1)=0.5 to every state element and P(0)=P(1)=0 to every RAM.
2. Assign the signal probabilities P(0)=P(1)=0.5 to every non-constrained primary input. If the primary input is constrained to 0 (1) during capture, set P(0)=1.0 and P(1)=0 (P(0)=0 and P(1)=1.0).
3. Calculate the signal probabilities of every combinational gate.
4. Calculate the next state capture probabilities $P^{next}(0)$ and $P^{next}(1)$ for every state element based on its input signal probabilities.
5. For i=0 to N-1, do:
   (1) If either $c_i$=false or $s_i$=true, go to Step 5.
   (2) If either $P_i^{next}(0)$ or $P_i^{next}(1)$ is not greater than a predefined threshold $TH_{capture}$, select it as a scan cell.
6. For i=0 to N-1, do:
   (1) If the $i^{th}$ node in SG does not have self-loop, go to Step 6.
   (2) If either $c_i$=false or $s_i$=true, go to Step 6.
   (3) Change the signal probabilities $P_i(0)$ and $P_i(1)$ of the $i^{th}$ node to be 0 and calculate the next capture probabilities of the same node due to this change.
   (4) If either $P_i^{next}(0)$ or $P_i^{next}(1)$ of the $i^{th}$ node becomes not greater than a predefined threshold $TH_{selfloop}$, select it as a scan cell.
   (5) Restore the signal probabilities to their values before carrying out Step 6(3).

Procedure weight_based_analysis(SG, $S_p$)
1. Associate two depth values $D_i^c$ and $D_i^o$ with every node in SG. $D_i^c$ is used to measure how difficult to control the $i^{th}$ node in SG from primary inputs or scan cells and $D_i^o$ is used to measure how difficult to observe the $i^{th}$ node in SG through primary outputs or scan cells. Both values are initialized to be equal to infinite.
2. For i=0 to N-1, set $D_i^c = 0$ if the $i^{th}$ node is either a primary input or a scan cell and set $D_i^o = 0$ if the $i^{th}$ node is either an observable primary output or a scan cell. In the following step, $D_i^c$ and $D_i^o$ will be automatically set to 0 once the $i^{th}$ node is selected as a scan cell.
3. For i=0 to N-1, call update_control_depth(SG, i) if $D_i^c = 0$.
4. For i=0 to N-1, call update_observation_depth(SG, i) if $D_i^o = 0$.
5. If there exists at least one node in SG with $c_i$=true, $s_i$=false, and $D_i^o$=Infinite, include all such kind of nodes in the node set NS. While NS$\neq \phi$, do:
   (1) Find a node j with largest $D_j^c$ from NS.
   (2) Select the node j as a scan cell -continued (3) Call update_observation_depth(SG,j).
(4) Call update_control_depth(SG,j).
(5) For every node j ∈ NS, remove it from NS if $D_j^o \neq$ Infinite.
6. While scan percentage is not greater than $S_p$, do:
(1) Calculate $M_j=(\alpha \times D_j^c + \beta \times D_j^o)$ for every node with $c_j$=true and $s_j$=false, where α and β are predefined weights and (α+β)=1.
(2) Find $M^{max}$ among all calculated $M_j$.
(3) Find a set of nodes, NS, with $M_j=M^{max}$.
(4) Chose a node j with the smallest $|\alpha \times D_j^c - \beta \times D_j^o|$ from NS and select it as a scan cell.
(5) Call update_observation_depth(SG,j).
(6) Call update_control_depth(SG,j).
Procedure update_control_depth(SG, i)
// i: The $i^{th}$ node in SG.
1. Initialize the traverse queue, Q, to be empty.
2. Add all the fanout nodes of the $i^{th}$ node into Q and mark them as being in Q.
3. While Q is not empty, do:
(1) Remove a node j from Q.
(2) If the node j is a scan cell, go to step 3.
(3) Find the minimal value, $D^c_{min}$, among the fanin nodes of the node j.
(4) If $(D^c_{min}+wc_j)<D_j^c$, set $D_j^c=D^c_{min}+wc_j$ and add all the fanout nodes of the node j into Q when they are not marked as being in Q.
(5) Unmarked the node j as being in Q.
Procedure update_observation_depth (SG, i)
// i: The $i^{th}$ node in SG.
1. Initialize the traverse queue, Q, to be empty.
2. Add all the fanin nodes of the $i^{th}$ node into Q and mark them as being in Q.
3. While Q is not empty, do:
(1) Remove a node j from Q.
(2) If the node j is a scan cell, go to step 3.
(3) Find the minimal value, $D^o_{min}$, among the fanout nodes of the node j.
(4) If $(D^o_{min}+wo_j)<D_j^o$, set $D_j^o=D^o_{min}+wo_j$ and add all the fanin nodes of the node j into Q if they are not marked as being in Q.
(5) Unmarked the node j as being in Q.

CONCLUSION

While the disclosed techniques has been described with respect to specific examples including presently preferred modes of carrying out the disclosed techniques, those skilled in the art will appreciate that there are numerous variations and permutations of the above described systems and techniques that fall within the spirit and scope of the disclosed techniques as set forth in the appended claims. For example, while specific terminology has been employed above to refer to electronic design automation processes, it should be appreciated that various examples of the disclosed techniques may be implemented using any desired combination of electronic design automation processes.

What is claimed is:

1. A method of selecting state elements in a circuit design for conversion into scan cells, executed by at least one processor of a computer, comprising:
computing, by the computer, at least one current-state signal probability value for one or more state elements in the circuit design, wherein a respective one of the one or more state elements forms a self-loop and wherein the current-state signal probability value for the respective one of the one or more state elements is assigned to be zero;
computing, by the computer, at least one next-state capture probability value for the one or more state elements based on the at least one current-state signal probability value;
selecting, by the computer, one or more of the state elements for conversion into scan cells based on the at least one next-state capture probability value being compared to a predefined threshold; and
converting the selected one or more of the state elements in the circuit design into scan cells, thereby generating a partial scan design for the circuit design.

2. The method recited in claim 1, further comprising:
determining, by the computer, at least one weight parameter according to a complexity of the one or more state elements;
computing, by the computer, at least one control weight value based on the at least one weight parameter and at least one corresponding controllability value of the one or more state elements;
computing, by the computer, at least one observation weight value based on the at least one weight parameter and at least one corresponding observability value of the one or more state elements; and
further selecting, by the computer, one or more of the state element for conversion into scan cells based on the at least one control weight value and the at least one observation weight value associated with the one or more state elements.

3. The method recited in claim 2, wherein the further selecting is performed until a predefined percentage of the state elements are selected.

4. The method recited in claim 2, wherein the further selecting comprises:
calculating weighted sums of the control weight values and the observation weight values and weighted differences of the control weight values and the observation weight values for the state elements.

5. The method recited in claim 2, wherein an initial value of the control weight value of a state element is determined based on complexity of combinational logic coupled to one or more inputs of the state element, and an initial value of the observation weight value of the state element is determined based on complexity of combinational logic coupled to one or more outputs of the state element.

6. The method recited in claim 2, wherein initial values of the control weight values and the observation weight values are determined based on the next-state capture probability values.

7. One or more non-transitory computer-readable media storing computer-executable instructions for causing one or more processors to perform a method of weight-based determination of state elements to be converted into scan cells in a partial scan design, the method comprising:
computing at least one controllability value for one or more state elements in a circuit design, including assigning a controllability value to be zero for a state element that forms a self-loop;
computing at least one observability value for the one or more state elements based on the at least one controllability value and a structure of the one or more state elements;
determining at least one weight parameter according to a complexity of the one or more state elements;
computing at least one control weight value based on the at least one weight parameter and the at least one corresponding controllability value of the one or more state elements;
computing at least an observation weight value based on the at least one weight parameter and at least one corresponding observability value of the one or more state elements;
selecting one or more of the state elements to be scan cells based on the at least one control weight value and the at least one observation weight value associated with the one or more state elements; and converting the selected one or more of the state elements in the circuit design into scan cells, thereby generating a partial scan design for the circuit design.

8. The one or more non-transitory computer-readable media recited in claim 7, wherein the method further comprises:
updating the at least one control weight value and the at least one observation weight value when the state element is selected.

9. The one or more non-transitory computer-readable media recited in claim 8, wherein the further selecting is performed until a predefined percentage of the state elements are selected.

10. The one or more non-transitory computer-readable media recited in claim 8, wherein the further selecting comprises:
calculating weighted sums of the control weight values and the observation weight values and weighted differences of the control weight values and the observation weight values for the state elements.

11. The one or more non-transitory computer-readable media recited in claim 8, wherein an initial value of the control weight value of a state element is determined based on complexity of combinational logic coupled to one or more inputs of the state element, and an initial value of the observation weight value of the state element is determined based on complexity of combinational logic coupled to one or more outputs of the state element.

12. The one or more non-transitory computer-readable media recited in claim 8, wherein initial values of the control weight values and the observation weight values are determined based on the next-state capture probability values.

13. A computerized system for designing partial scan circuits, comprising:
a signal probability determination unit configured to determine at least one current-state signal probability value for state elements in a circuit design, wherein the at least one current-state signal probability value is assigned to be zero so as to maintain a self-loop intact for a respective state element that forms a self-loop;
a next-state capture probability computation unit configured to compute at least one next-state capture probability value for the state elements in the circuit design based on the current-state at least one current-state probability value and a structure of the state elements
a probability-based scan cell selection unit configured to select scan cells from the state elements based on the next-state capture probability values; and
a weight-based scan cell selection unit configured to further select scan cells from the state elements based on at least one weighted sum of one control weight depth value, one observation weight depth value, and one weighted difference of the at least one control weight depth value and the at least one observation weight depth value of the state elements, wherein the at least one control weight depth value is associated with a first predetermined weight parameter and the at least one observation weight depth value is associated with a second predetermined weight parameter.

14. The computerized system recited in claim 13, further comprising:
a weight-based scan cell selection unit configured to further select scan cells from the state elements based on control weight values and observation weight values associated with the state elements, wherein the control weight value of a state element corresponds to controllability of the state element and the observation weight value of a state element corresponds to observability of the state element, and the control weight values and the observation weight values are updated when a state element is selected.

* * * * *